United States Patent
Wehby

(10) Patent No.: US 7,302,914 B1
(45) Date of Patent: Dec. 4, 2007

(54) CLIMATE CONTROLLED PET HOUSE

(76) Inventor: George A. Wehby, 111 Asbury Rd., Winchester, VA (US) 22602

( * ) Notice: Subject to any disclaimer, the term of this patent is extended or adjusted under 35 U.S.C. 154(b) by 0 days.

(21) Appl. No.: 11/481,976

(22) Filed: Jul. 6, 2006

(51) Int. Cl.
*A01K 1/03* (2006.01)

(52) U.S. Cl. ...................... 119/500; 119/482
(58) Field of Classification Search ........ 119/482, 119/486, 500, 501, 445
See application file for complete search history.

(56) References Cited

U.S. PATENT DOCUMENTS

| | | | |
|---|---|---|---|
| 3,172,392 A | * | 3/1965 | Schultz ................. 119/482 |
| 3,962,993 A | | 6/1976 | Dattilo |
| 4,495,892 A | * | 1/1985 | Jodar et al. ................. 119/482 |
| 4,729,343 A | | 3/1988 | Evans |
| 4,827,872 A | | 5/1989 | Sommers |
| 5,003,923 A | | 4/1991 | Morgan |
| 5,551,371 A | * | 9/1996 | Markey et al. ............. 119/499 |
| 6,234,116 B1 | | 5/2001 | Havener |
| 6,318,294 B1 | * | 11/2001 | Richmond et al. .......... 119/482 |
| 6,923,144 B2 | | 8/2005 | Little |

* cited by examiner

*Primary Examiner*—Son T. Nguyen

(57) ABSTRACT

An insulated pet house is shaped in the manner of a pyramid to maintain a comfortable environment for an animal and which is also aesthetically pleasing. The pet house includes an interchangeable top portion that has a heat-generating lamp for cold-weather use and another portion has a fan for hot-weather use.

3 Claims, 1 Drawing Sheet

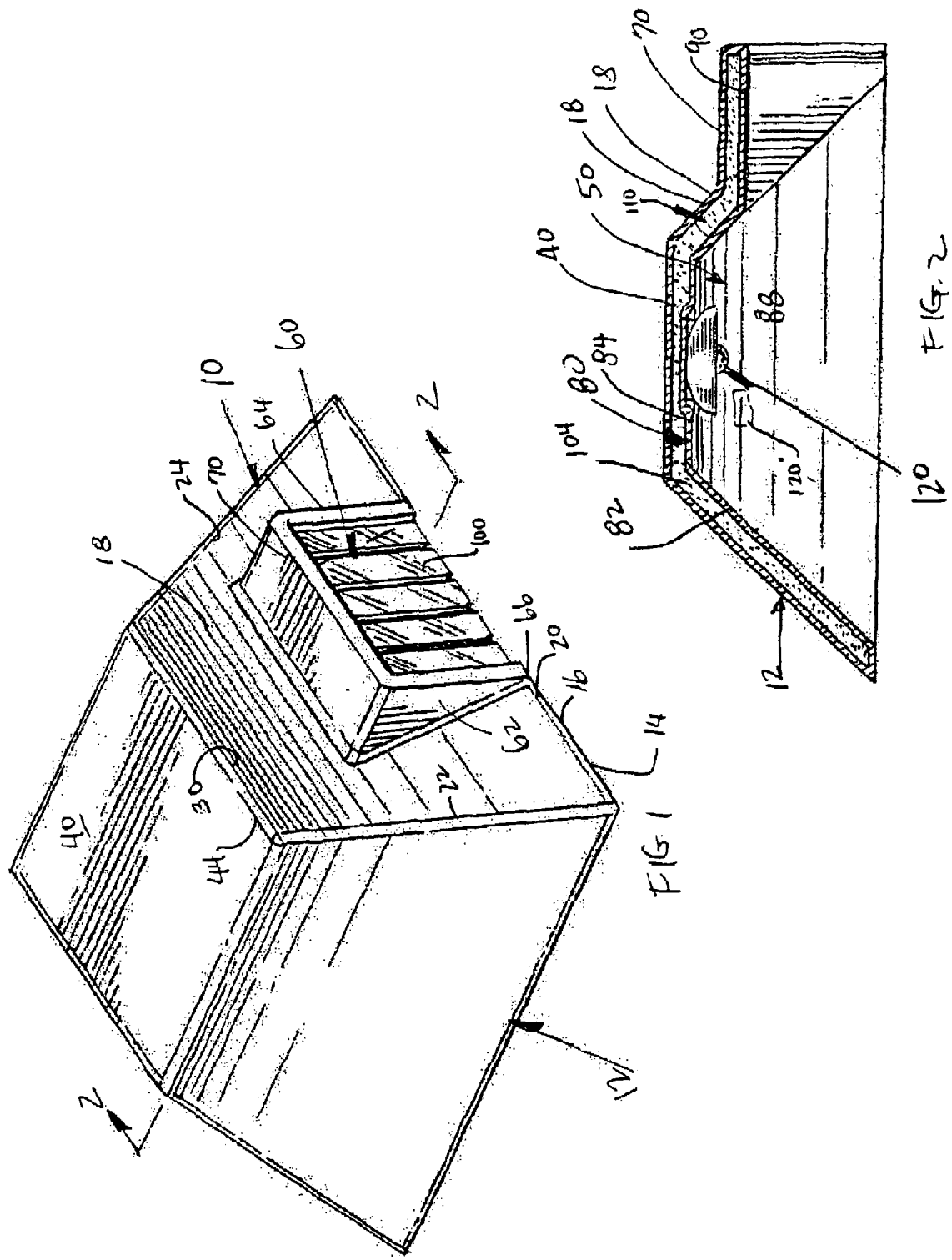

CLIMATE CONTROLLED PET HOUSE

TECHNICAL FIELD OF THE INVENTION

The present invention relates to the general art of enclosures, and to the particular field of animal houses.

BACKGROUND OF THE INVENTION

Man has kept domesticated animals as pets since even before the beginning of recorded history. Dogs and cats have always been the two favorite kinds of pets. There are many reasons that people keep dogs: as companions, work dogs, guard dogs, or a combination of all of these. A prenatal need of every domestic animal is a place to rest. It is particularly important to provide a dog with a suitable bed, preferably a place where he can curl up to rest, to obtain nature, and to bask in the feeling of security. Although dogs have been domesticated for centuries, their primal instincts of crawling into a cave-like structure to rest have not changed much. Ideally, a dog's sleeping quarters should be "cave-like," to give him a feeling of security and, at the same time, avoid drafts of air. The health of a dog and, in fact, his overall domestic behavior will often depend upon the adequacy of his sleeping quarters.

Another desirable characteristic of sleeping quarters for a dog is that of "snugness" or "cuddliness" which also contribute to the animal's feeling of security and wellbeing. Such cuddliness can be achieved by closely confining the animal's body with soft resilient padding. Conventional sleeping quarters which have tried to provide this feature have been limited by the fact that dogs vary greatly is size and structure providing closeness for a large size dog may be cavernous for a much smaller dog.

Some dogs are kept outdoors requiring an outdoor kennel. This, of course, requires an open area such as a yard or a garden, a luxury often not available for city dwellers. Still, many people prefer to keep their pet dogs indoors, regardless of whether or not a yard or a garden is available. Apartment dwellers, of course, have no alternative but to keep their pets indoors. In close domestic quarters it is desirable for the dog to be able to enter its resting place from more than one direction.

Dog houses are typically employed with dogs that are kept outside of their master's house for prolonged periods of time. Generally, dog houses are simple structures comprised of a frame, wooden boards attached to the framing so as to enclose the structure, and some weather protective coating placed on the outwardly facing surfaces of the boards to prevent degradation of the structure. The houses, however, are not insulated or at most, contain hay or some form of bedding positioned therein to retain heat.

Conventional houses for dogs, cats, or similar animals have been constructed in a multiplicity of different ways, generally to satisfy the particular desires of the owner of the occupant-animal. Little overall sophistication has been employed because for the most part domestic animals were kept generally indoors during inclement or cold weather, and out of doors otherwise. Moreover, many people prefer to take their dog along when they travel. To these people, leaving their dog behind and boarding him while they are away from home is bordering on cruelty to a family member. When pet owners left their homes for an appreciable length of time neighbors were generally entrusted with the care of their pets, or the pets were simply boarded with professional "pounds". However, absent the latter two possibilities pets were simply permitted to fend for themselves out of doors, in basements or the like and found themselves more than uncomfortable, particularly during cold weather if out of doors or if indoors the house thermostat was lowered appreciably, as is the usual practice of persons who leave their dwellings for extended periods of time.

The problems noted heretofore are compounded if the pet owners live in apartments, townhouses, condominiums or the like which have no basements or common areas, other than a porch or patio, for the tethering, keeping, etc. of unattended pets.

SUMMARY OF THE INVENTION

The above-discussed disadvantages of the prior art are overcome by an insulated pet house that is shaped is shaped in the manner of a pyramid to maintain a comfortable environment for an animal and which is also aesthetically pleasing. The pet house includes an interchangeable top portion that has a heat-generating lamp for cold-weather use and another portion has a fan for hot-weather use.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 is a perspective view of an animal house embodying the present invention.

FIG. 2 is a sectional view taken along line 2-2 of FIG. 1.

DETAILED DESCRIPTION OF THE INVENTION

Referring to the figures, it can be understood that the present invention is embodied in an animal house 10 that is aesthetically pleasing yet can be modified to maintain a comfortable environment for an animal inside the house. House 10 comprises an outer body 12 that is in the shape of an obelisk. As used herein, an obelisk is the frustum of a rectangular pyramid.

Housing 12 has a rectangular base 14 which rests on the ground when the outer body is in use. Rectangular base 14 includes four side edges, such as edge 16, and four trapezoidal side walls, such as side wall 18. Each side wall has a base edge, such as base edge 20, which is unitary with one of the side edges of the rectangular base. Each side wall further has two non-parallel side edges, such as side edges 22 and 24, and a top edge 30 that is parallel with and spaced apart from the base edge of the side wall.

A rectangular top wall 40 is parallel with and spaced apart from rectangular base 14 and has four side edges, such as side edge 44, each of which is unitary with a top edge of each of the side walls. The outer body is hollow with the rectangular base, the side walls and the top wall all combining with each other to define an interior volume 50 inside the outer body.

An entranceway 60 is defined through one of the side walls. Entranceway 60 includes two triangular side elements 62 and 64 which are unitary with one of the side walls of the body. Each side element has an apex 66 that is unitary with one of the side edges of the rectangular base. A rectangular overhang 70 is unitary with the side wall that is unitary with the triangular side elements and with the bases of the two triangular side elements and extends parallel to and spaced apart from the rectangular base.

An inner body 80 is shaped to match the outer body and, as can be understood from FIG. 2, is slightly smaller than the outer body to be accommodated in the interior volume of the outer body. The inner body is removably accommodated inside the interior volume of the outer body to it can be changed as will be understood from the teaching of this disclosure. Inner body 80 includes a plurality of trapezoidally shaped side walls, such as side wall 82 that are each located immediately adjacent to a corresponding trapezoidally shaped side wall of the outer body and a rectangular top wall 84 that is located immediately subadjacent to rectangular top wall 40 of the outer body.

Inner body 80 is hollow with the rectangular base of the outer body, the side walls of the inner body and the top wall of the inner body all combining with each other to define an interior volume 88 inside the inner body. As can be understood from FIG. 2, interior volume 88 coincides with interior volume 50. A rectangular overhang 90 is unitary with one of the side walls of the inner body and is located immediately subadjacent to rectangular overhang 70 of the outer body and the entranceway.

A plurality of flexible flaps, such as flap 100, hang dependently from rectangular overhang 90 of the inner body and contact the ground adjacent to the outer body to cover the entranceway while permitting an animal ingress to and egress from the interior of the house 10. A gap 104 is defined between the side walls of the inner body and the side walls of the outer body and between the top wall of the inner body and the top wall of the outer body and between the overhang of the inner body and the overhang of the outer body.

Insulation 110 is located in the gap. The insulation is of the type commonly used on residential buildings and is sold in sheet form. An interior volume environment conditioning element 120 is mounted on the top wall of the inner body in the interior volume of the inner body.

In the form shown in FIG. 2, element 120 is a heating element to heat the interior of the house during cold weather. However, a fan 120' can be used in place of heating element 120 during hot weather to cool the interior of the house. The element 120 can be powered using an extension cord connected to utility power if suitable. Alternatively, the tops 40 and 84 of the housings can be removable from the side walls so the elements 120 and 120' can be changed.

The pyramid shape of the house is not only aesthetically pleasing, it acts to control heat transfer to and from the house. The removable nature of the inner body with respect to the outer housing and the slab form of the insulation makes it easy to change the house to accommodate weather conditions.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. An animal house consisting of:
   A) an outer body that is in the shape of an obelisk, having
      (1) a rectangular base which rests on the ground when the outer body is in use, the rectangular base including four side edges,
      (2) four trapezoidal side walls, each side wall having a base edge which is unitary with one of the side edges of the rectangular base, two non-parallel side edges and a top edge that is parallel with and spaced apart from the base edge of the side wall,
      (3) a rectangular top wall that is parallel with and spaced apart from the rectangular base and has four side edges each of which is unitary with a top edge of each of the side walls,
      (4) the outer body being hollow with the rectangular base, the side walls and the top wall all combining with each other to define an interior volume inside the outer body;
   B) an entranceway defined through one of the side walls, the entranceway including
      (1) two triangular side elements which are unitary with one of the side walls of the body, each side element having an apex that is unitary with one of the side edges of the rectangular base, and
      (2) a rectangular overhang which is unitary with the side wall that is unitary with the triangular side elements and with the bases of the two triangular side elements and which extends parallel to and spaced apart from the rectangular base;
   C) an inner body which is shaped to match the outer body and which is slightly smaller than the outer body, the inner body inside the interior volume of the outer body, the inner body including
      (1) a plurality of trapezoidally shaped side walls that are each located immediately adjacent to a corresponding trapezoidally shaped side wall of the outer body,
      (2) a rectangular top wall that is located immediately subadjacent to the rectangular top wall of the outer body,
      (3) the inner body being hollow with the rectangular base of the outer body, the side walls of the inner body and the top wall of the inner body all combining with each other to define an interior volume inside the inner body,
      (4) a rectangular overhang that is unitary with one of the side walls of the inner body and which is located immediately subadjacent to the rectangular overhang of the outer body and the entranceway, and
      (5) a plurality of flexible flaps hanging dependently from the rectangular overhang of the inner body and contacting the ground adjacent to the outer body to cover the entranceway;
   D) a gap defined between the side walls of the inner body and the side walls of the outer body and between the top wall of the inner body and the top wall of the outer body and between the overhang of the inner body and the overhang of the outer body;
   E) insulation in the gap; and
   F) an interior volume environment conditioning element mounted on the top wall of the inner body in the interior volume of the inner body.

2. The animal house defined in claim 1 wherein the interior volume conditioning element is a heat-generating lamp.

3. The animal house defined in claim 1 wherein the interior volume conditioning element is a fan.

* * * * *